United States Patent

Hamrick

[15] 3,637,946

[45] Jan. 25, 1972

[54] EQUIPMENT FOR CONTROLLING INTEROFFICE SIGNALING DURING A GLARE CONDITION

[72] Inventor: Harold E. Hamrick, Columbus, Ohio

[73] Assignee: Bell Telephone Laboratories, Incorporated, Murray Hill, Bekeley Heights, N.J.

[22] Filed: Jan. 7, 1970

[21] Appl. No.: 1,136

[52] U.S. Cl. ........................................................ 179/18 AH

[51] Int. Cl. ........................................................ H04m 7/10

[58] Field of Search ............................................. 179/18 AH

[56] References Cited

UNITED STATES PATENTS 3,491,213 1/1970 Gilboy et al........................179/18 AH

*Primary Examiner*—Kathleen H. Claffy

*Assistant Examiner*—Thomas W. Brown

*Attorney*—R. J. Guenther and James Warren Falk

[57] ABSTRACT

This pertains to equipment which is activated when automatic call switching circuitry at different offices simultaneously seize the same two-way interoffice trunk to complete different call requests. Included in this equipment is detection circuitry which causes one office to withdraw its call request enabling the other office to complete the call. A particular aspect of the invention concerns apparatus responsive to supervisory signals on the trunk for automatically converting the seizure signal forwarded by one office to an on-hook signal to prevent transmission of a premature acknowledgment signal to the other office.

10 Claims, 3 Drawing Figures

INVENTOR
H. E. HAMRICK
BY
Charles H. Davis
ATTORNEY

EQUIPMENT FOR CONTROLLING INTEROFFICE SIGNALING DURING A GLARE CONDITION

BACKGROUND OF THE INVENTION

This invention relates to a telephone system having a two-way interoffice trunk, and, more particularly, to equipment in such a system for reducing trouble conditions which result when the trunk is seized simultaneously to serve a call originated at each office.

DESCRIPTION OF PRIOR ART

In order that trunking facilities are utilized efficiently and economically, trunks are often used for serving calls in each direction between two telephone offices. Each terminus of such a two-way trunk customarily terminates at each one of the offices in a two-way trunk circuit which establishes and supervises call connections between the trunk and a switching network of each office.

When a two-way trunk is seized at one office, that office attaches a sender to the trunk, forwards a seizure signal to the other office, and waits for the distant office to return a signal, "start dialing" signal, indicating readiness to receive an address code. In the event of a simultaneous seizure by both offices, the same action occurs at each end of the trunk. The seizure signal of one office is not discernible at the other office from a start dialing signal, and oftentimes a sender erroneously outpulses the address code causing a call to be lost. Other incidental troubles occur, such as stuck senders, false charging, and repeated trouble indications where automatic trouble recorders are provided. The opposing action of the two ends of the trunk has come to be known as "glaring" and the condition as a "glare condition."

Various solutions have been employed to overcome glaring. Two-way trunks have been temporarily directionalized, or reserved, after a call to give preference to subsequent calls originated at a particular office. This arrangement does effectively reduce the possibility of simultaneous seizures, but it also requires the addition of costly equipment in trunk circuits of both offices and reduces call traffic handling capacity inherent in two-way trunk circuit arrangements.

Another approach to the resolution of a glare condition is the so-called timed-return-signal arrangement. After a seizure signal has been forwarded, a timer in the originating office trunk circuit is activated to time the receipt of an answer signal. If a signal is received during the timing interval, the received signal is determined to be nonresponsive to the forwarded seizure signal and, accordingly, a glare condition is detected. Ordinarily upon detection, call traffic from one of the offices is given preference and the opposing call traffic is rerouted.

The latter arrangement, although substantially effective in reducing the serious effects of glare, is undesirable because complex and costly circuitry is required in every two-way trunk circuit at each office. Also, the types of interoffice signals, of necessity, are increased to work with this arrangement. An even more serious drawback is the fact that even though a double seizure can be detected, calls are often lost since the presence of the opposing signal erroneously sets in motion the outgoing sender apparatus.

Accordingly, it is an object of this invention to furnish an economical as well as an improved arrangement for the detection of simultaneous seizures on two-way trunks without requiring changes in the number or type of interoffice signals presently existing in conventional switching systems. Moreover, it is an object to furnish an arrangement which prevents the transmission of one of the opposing signals during a glare condition obviating the attendant problems of timed-return-signal glare detection arrangements.

SUMMARY OF THE INVENTION

These and other objects of the invention are attained in accordance with an exemplary embodiment thereof in which switching apparatus is furnished in a two-way trunk circuit at one office for detection of simultaneous seizures of a trunk and for automatically converting a seizure signal forwarded by that office into an on-hook signal in the presence of an opposing seizure signal from the distant office. Advantageously, the apparatus of this invention is capable of responding before the actual detection of a glare condition by the timing detection circuitry so that the undesired seizure signal can be removed before the distant office circuitry is capable of recording prematurely an acknowledgement (start dial) signal.

Upon the connection of a local call to the two-way trunk circuit, a seizure signal is forwarded over the interoffice trunk facilities to the distant office. Under ordinary conditions, the distant office responds to the receipt of this signal by readying the local switching equipment to receive an address code. As soon as the equipment is ready, the distant office returns an acknowledgment, or start dial, signal. The call address is then forwarded to the distant office and a call connection is completed to the called station in a customary manner.

Prior to the seizure of a two-way trunk circuit, a high impedance monitoring circuit, also referred to as an idle circuit bridge, is connected to the transmission facilities. To forward a seizure signal, the idle circuit bridge is converted to a low impedance by shunting the high impedance element in the bridge. Importantly, when the low impedance bridge is initially connected to the trunk conductors, a unidirectional current device is included as part of the bridge circuit. If the distant office trunk circuit is idle, a voltage is impressed on the trunk conductors. The voltage connection orientation is such that current flows in the low impedance bridge. The importance of the current device in the glare detection arrangement will become apparent from subsequent discussions.

For calls originated in the distant office, the seizure of the interoffice trunk is indicated by a reversal of the voltage polarity on the trunk conductors. This reversal is recognized by the near office trunk circuitry monitoring the trunk conductors to cause a subscriber sender to become attached on the call. Thereafter, a call address is transmitted over the facilities and the call is completed in the usual manner.

During a glare condition the low impedance monitoring circuit of the near office, including the unidirectional current device, is connected to the trunk conductors while a reversed-battery-feed circuit is connected to the trunk conductors by the two-way trunk circuit at the distant office. The seizure signal of the near office is not recognized at the distant office in the presence of the opposing seizure signal, reversed battery, due to the unidirectional device. The near office trunk circuit does, however, recognize the seizure signal sent by the distant office; and since it occurs during the timed interval, the local office connection at the near office gives way to the distant office call. It is noteworthy that, but for the insertion of the unidirectional current device, the near office seizure signal would be recognized at the distant office and the near office sender or subscriber would be prematurely connected to the call. Instead, the near office call can be rerouted to a different trunk and the distant office call is allowed to continue and thus both calls are saved. It is to be further observed that the glare detection circuitry is required only in one trunk circuit, thereby substantially reducing the cost of the arrangement.

DESCRIPTION OF THE DRAWING

The foregoing objects, features, and advantages, as well as others of the invention, will be more apparent from the following description of the drawing, in which.

Figure 2:
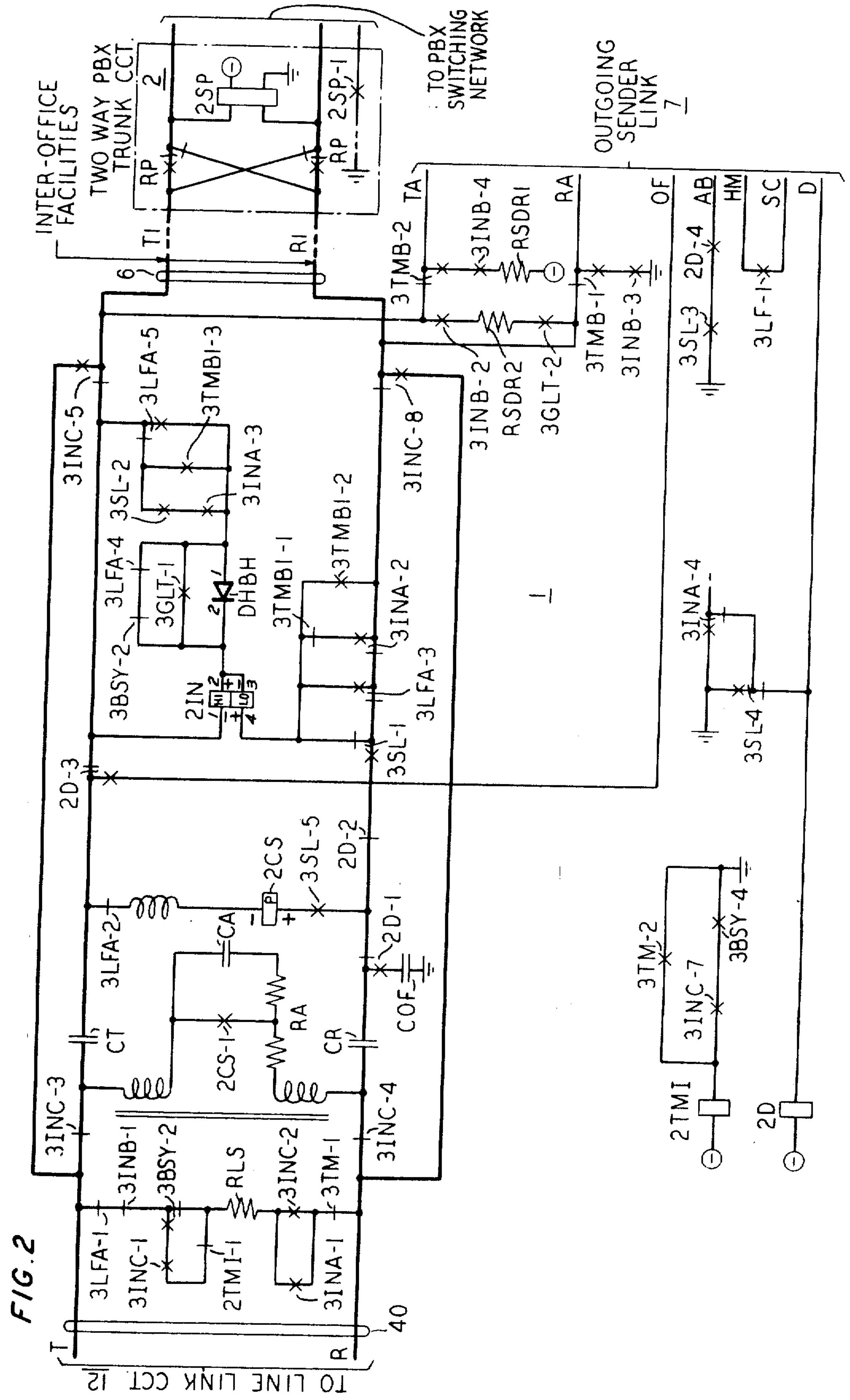
FIGS. 2 and 3 depict a schematic drawing of the two-way trunk circuit having features illustrative of the invention.
Figure 3:
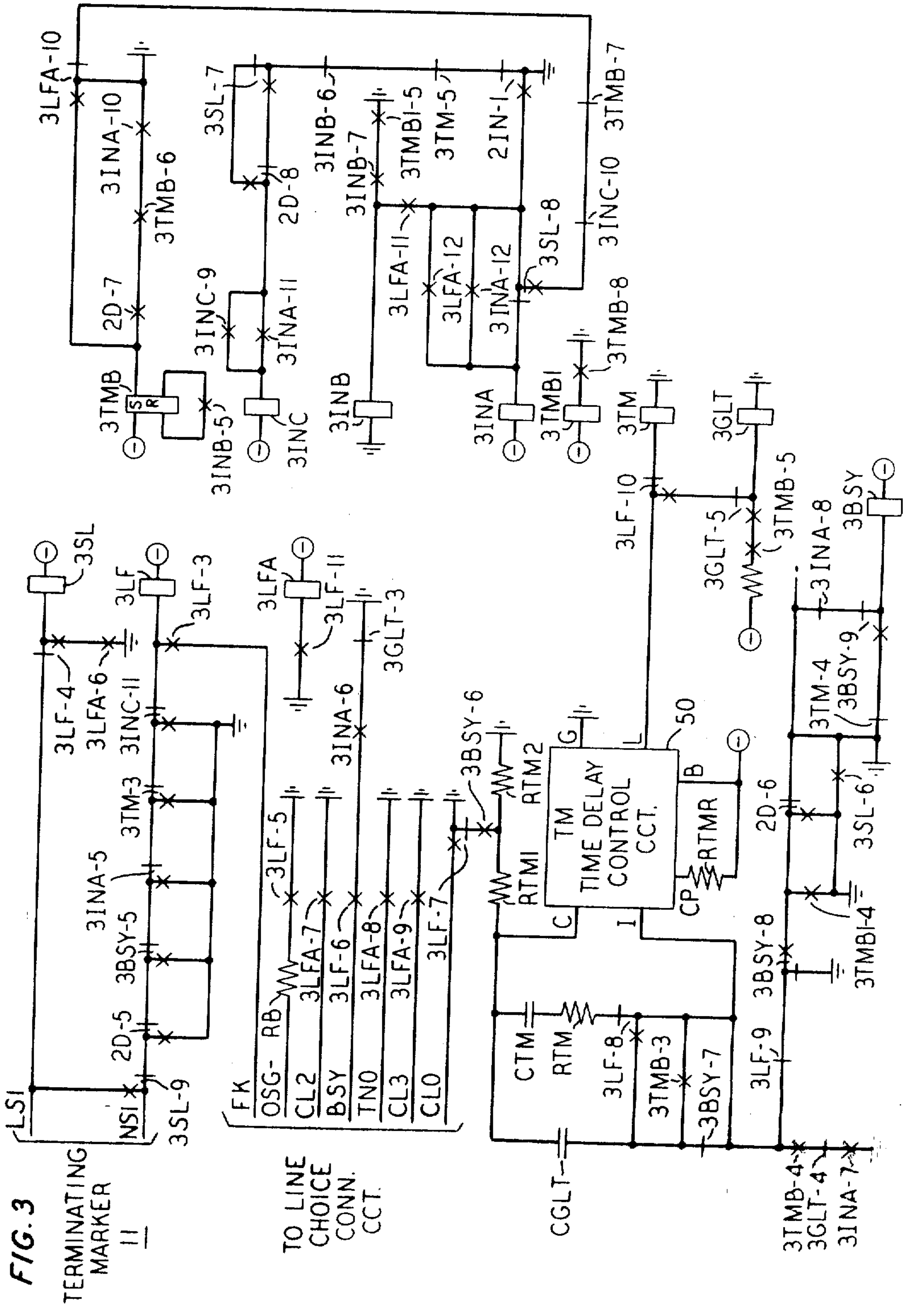

It will be noted that FIGS. 2 and 3 employ a type of notation referred to as "detached-contact" in which an X crossing a line represents a normally open or make contact of a relay and a bar crossing a line represents a normally closed or break contact of a relay, "normally" referring to the nonoperated, or released, state of the relay. The other relay components, including its winding, are represented by a rectangular symbol. Principles of this type of notation are described in an article entitled "An Improved Detached-Contact-Type of Schematic Circuit Drawing" by F. T. Meyer in the Sept. 1955 publication of the *Transactions of the American Institute of Electrical Engineers, Communications and Electronics*, No. 20, Vol. 74, pp. 505–513.

Each relay contact is designated in the drawing in a manner which indicates the relay of which it is a part, the drawing figure on which the winding is shown, and uniquely identifies it with respect to other contacts of the same relay. For example, referring to contact 2D-3 at the top center of FIG. 2, it is noted that the 2D-portion of the designation indicates that it is controlled by the 2D relay; the number 2 indicates that the relay winding of the 2D relay is situated in FIG. 2; and the number 3 uniquely identifies the contact with respect to others of relay 2D.

The equipment illustrative of the principles of this invention has been designed for incorporation, by way of example, into a number 1 type crossbar telephone switching system. A description of the major system components and their operation may be found in the text entitled "Electrical Engineers Handbook" by H. Pender and K. McIlwain, Section 17 beginning at page 29, et. seg. It is to be understood, however, that the present invention is not limited to use with a telephone system of this type because it may be utilized with other types of telephone systems. Inasmuch as the invention is particularly concerned with the apparatus of the illustrative two-way trunk circuit 1, the other equipment units of the crossbar system are depicted in the drawing in block diagram form. The latter units are neither shown nor described in detail herein except where necessary for a more complete understanding of the invention.

GENERAL DESCRIPTION

Figure 1:
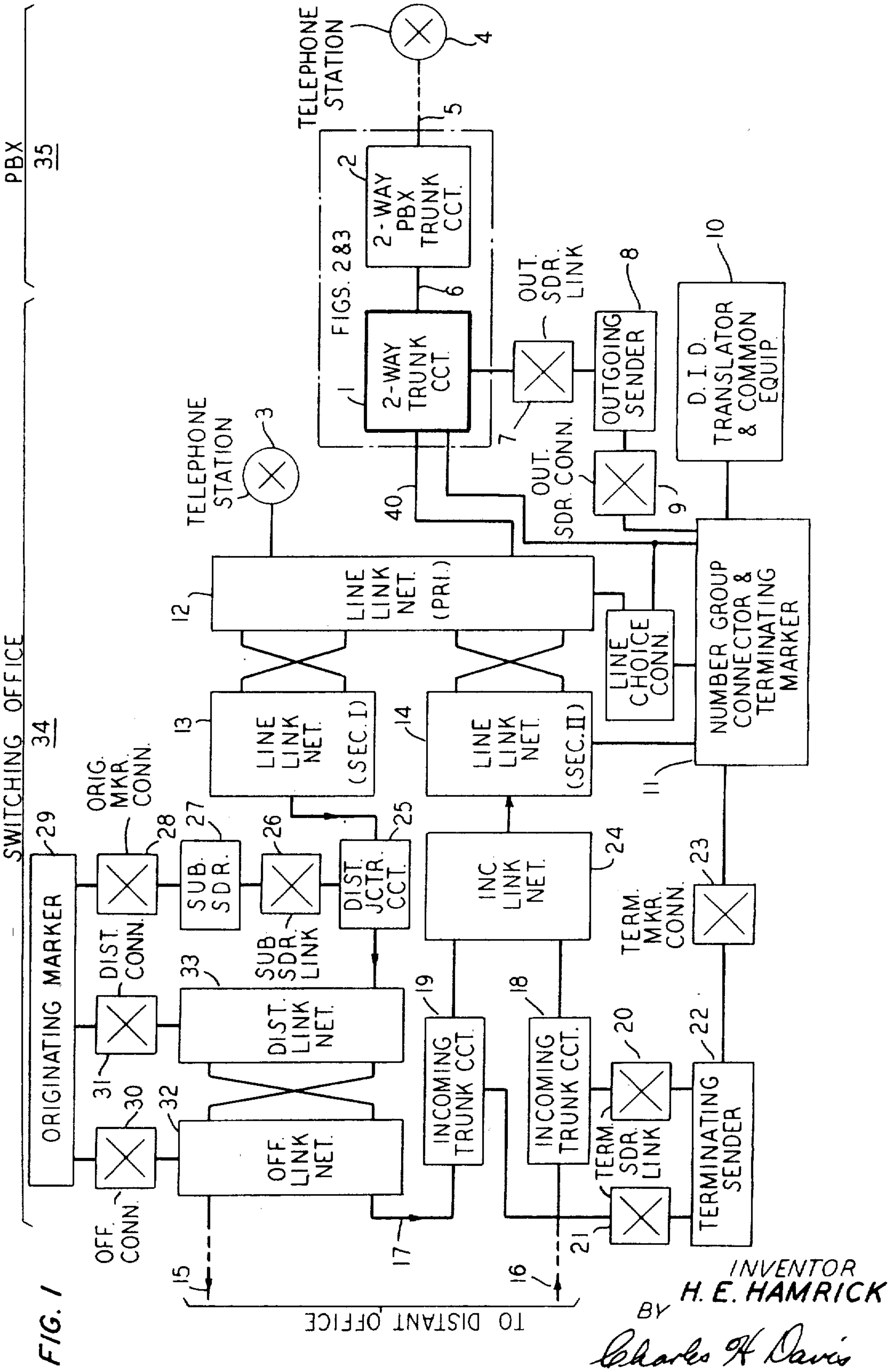
FIG. 1 shows in block diagram form an exemplary two-way trunk circuit (shown in heavy outline) employed in an existing crossbar-type telephone office.

The organization of the principal equipment units of the illustrative embodiment will now be described with reference to FIG. 1. All interoffice trunk circuits from local telephone offices terminate in two-way and incoming trunk circuits which are connected either to the line link network 12 or incoming link network 24. Outgoing calls to other offices are routed through the office link network 32, line link network 12, and to a trunk circuit 1. Interoffice calls are selectively interconnected by means of district junctor circuits and incoming trunk circuits, for example, circuits 25 and 19, respectively.

Calls are initially controlled by originating marker 29 to establish connections to subscriber senders, such as, sender 27. The completion of a call connection is under control of terminating marker 11.

Interoffice trunks, such as, trunk circuits 1 and 18, have access to senders, such as, outgoing sender 8 and terminating sender 22, through sender links, such as, link 7 and 20. Trunk circuit-to-sender connections are established under control of marker 11 via connector circuits, such as, connectors 9 and 23. A sender circuit in this system may be used to receive and register information regarding the location of trunk circuits, the called office code, and the called customer line number. Senders are also arranged to convey information to marker 11 or 29 or to directly outpulse call address information via trunk facilities to other offices.

A typical connection is established as follows. If station 3 goes off hook, a connection is initially established between an idle subscriber sender, for example, sender 27, and the station 3 line termination in line link network 12. This connection path includes, as well, a communication path through line link network 13, a district junctor circuit, for example, circuit 25, and subscriber sender link 26. Upon the registration of a called address code or other directing digits, originating marker 29 is connected on the call via the originating marker connector 28 to sender 27. The marker determines a path through the office and district link networks 32 and 33; and if the call is to terminate locally, marker 29 selects an idle incoming trunk circuit over which the call is to be completed. If the call is to a distant office, a path through networks 32 and 33 to interoffice trunk 15 is established. On a local call, circuit 19 is connected to a terminating sender 22 via terminating sender link 21 for registering the pulses corresponding to the called number. When the called number is recorded, terminating marker 11 is connected to terminating sender 22 and the number is forwarded to marker 11. Marker 11 thereafter selects a path between incoming trunk circuit 19 and the called station via incoming link network 24, network 14, and network 12. In the event the call was destined for termination to PBX 35, marker 11 engages D.I.D. translator and common equipment 10 to further translate the called number. In the latter event, a two-way trunk circut—circuit 1 for example—is chosen for completing the call and an outgoing sender, such as, sender 8, is connected via outgoing sender link 7 to trunk circuit 1. Also, the called number is transferred via outgoing sender connector 9 to sender 8.

When markers 29 and 11 have completed the foregoing circuit operations and others, which are not described herein because they are not necessary for an understanding of the invention, the markers and their respective connectors are released. When an outgoing sender such as, sender 8, is required on a call, the stored number is outpulsed by the sender to the connected office or PBX automatically upon the receipt of a seizure acknowledgment signal. Following transmission of the number, the sender releases automatically from the connection. Supervision over the called connection is then maintained by the respective connected trunk circuits.

DETAILED DESCRIPTION

Trunk Circuits 1 and 2 in Idle State

Referring now to FIGS. 2 and 3, a detailed description is presented of the structure and operation of the inventive features of the disclosure as specifically embodied by way of example in the two-way trunk circuit 1. It is noted that trunk circuit 1 forms a transmission and switching circuit which provides a communication path (heavily lined) from the interoffice trunk 6 to the pair of conductors 40 associated with line link network 12. It also provides a communication path between trunk 6 and outgoing sender link 7 which connects, as may be seen in FIG. 1, to outgoing sender 8.

The essential circuit elements of PBX trunk circuit 2 which are necessary to an understanding of this invention are shown. These are a supervisory relay 2SP which connects to trunk 6 for monitoring the path to detect a loop closure and a pair of transfer contacts labeled RP which control the connection of relay 2SP to the conductors of trunk 6. In the idle state, on-hook condition, negative potential battery is applied via the upper winding of relay 2SP to conductor R1 of trunk 6. Ground potential is applied via the lower winding of relay 2SP to conductor T1 of trunk 6. Both paths include nonoperated contacts of transfer contacts RP.

Trunk circuit 1 in the idle condition provides a high impedance bridge across the conductors of trunk 6. Circuit 1 includes relay 2IN, a polarized double-wound relay, for monitoring the trunk conductors. It is noted that due to the high impedance of relay 2IN, relay 2SP of trunk circuit 2 does not operate in series therewith. Also, because of the winding orientation of relay 2IN, it does not operate on the idle circuit voltages impressed on trunk 6.

The interoffice trunk signaling arrangement between trunk circuit 1 and circuit 2 is commonly known as reverse high-low supervision. In other words, circuit 2 sends signals by reversing the battery and ground potential of the trunk conductors, while circuit 1 signals by connecting low and high impedance bridges across the trunk conductors.

Incoming Calls to Switching Office 34 from PBX 35

When PBX 35 is presented with an outgoing call which is to be completed by a switching office 34, it selects an idle trunk circuit, for example circuit 2, and causes the latter to send a seizure signal to office 34 by reversing the polarity of trunk 6 conductors. This action completes a path for operating relay 2IN of circuit 1. Beginning at ground in circuit 2, the operating path includes a lower winding of relay 2SP, make contact of transfer RP, conductor R1, break contact of transfer 31INC-8, 3INA-2, 3LFA-3 and 3SL-1, the windings of relay 2IN, break contact of transfer contact 3INC-5, conductor T1, make contact of transfer RP, and the upper winding of 2SP to battery. In operating, relay 2IN operates relay 3INA whose winding is shown in the center portion of FIG. 3. This operating path may be traced from battery, the winding of 3INA, break contact of transfer 3SL-8, and make contact of transfer 2IN-1 to ground. In operating relay 3INA actuates contact 3INA-1 shown in left-hand side of FIG. 2, for applying a loop closure signal between conductors T and R to signal circuits of office 34 to establish a connection between the conductors and an idle subscriber sender, such as, sender 27. The latter connection is completed as discussed previously via line link network 12, 13, district junctor circuit 25, and subscriber sender link 26.

As soon as a sender is attached, trunk circuit 1 forwards an acknowledgment or start dialing, signal over trunk 6 to PBX trunk circuit 2 for operating relay 2SP. In the PBX, this signal indication may be utilized in various ways depending upon the particular type of PBX circuitry. For example, it could be used to actuate a sender to outpulse a stored address code over trunk 6 or to connect second dial tone for indicating that the caller may continue dialing an address code. In particular, when subscriber sender 27 is attached, lead LS1 shown in the upper left-hand corner of FIG. 3 is grounded by marker 11 for operating relay 3SL over an obvious path. In turn, as shown in FIG. 2 actuated contact 3INA-3 closes a path shunting the upper winding, terminals 1 and 2 of relay 2IN, thereby removing the high-resistance winding of relay 2IN from the bridge circuit and leaving the low resistance lower winding therein. The upper winding shunt path may be traced from terminal 2 of relay 2IN via break contacts of transfers 3BSY-2 and 3LFA-4, and make contacts 3INA-3 and 3SL-2, and break contact of transfer 3LFA-5 to terminal 1 of relay 2IN. Relay 2IN remains operated held solely on the lower winding by the battery on the trunk 6 conductors.

Upon receipt of the acknowledgement signal at PBX trunk circuit 2, the PBX transmission path is converted from a battery feed circuit (relay 2SP) to a loop-pulsing circuit by apparatus not shown. As soon as the PBX trunk circuit 2 converts to the loop-dialing path, relay 2IN releases and initiates circuit action which furnishes a metallic path between trunk 6 conductors and conductors 40. It is noted that after the release of relay 2IN, circuit 1 is thereafter entirely controlled by subscriber sender 27 until sender 27 is released from the call. In particular, upon the removal of battery by circuit 2 from conductors of trunk 6 relay 2IN releases. This results in the operation of relays 3INC and 3BSY (FIG. 3). A path for operating relay 3INC may be traced from battery via its winding, make contact 3INA-11, break contact of transfer contact 2D-8, make contact of transfer 3SL-7, break contacts 3INB-6 and 3TM-5, and break contact of transfer 2IN-1 to ground. Relay 3INA releases and relay 3BSY operates from battery through its winding via a break contact of transfer 3BSY-9, break contact 3INA-8, and make contact 3SL-6 to ground. The metallic path (shown in heavy outline of FIG. 2) is established by actuated contacts 3INC-5 and 3INC-8 for connecting respectively trunk 6 and conductors 40. Circuit 1 also removes the sender start loop across conductors 40 by the operation of relay contact 3BSY-1 shown at the left side of FIG. 2 since a dialing loop is now furnished at PBX 35.

After dialing is complete, office 34 extends the call to another office or to a local station, as required. Circuit 1 is held operated by the district junctor circuit which is in turn controlled by supervisory signals on the transmission conductors.

Disconnect of PBX Originated Calls

Circuit number 1 does not recognize a disconnect of the calling or called parties, and it releases when the associated district junctor circuit removes ground from lead LS1, releasing relay 3SL (FIG. 3). When relay 3SL releases, time delay control circuit 50 is activated by the removal of ground from terminal I. Circuit 50 provides a so-called trunk guard timing interval (nominally 800 ms.) after which time relay 3TM operates. The latter relay forces the release of all operated relays and restores circuit 1 to its idle state.

Call to PBX 35

Turning now to the instance where trunk circuit 1 is used for completing an outgoing call from office 34 to PBX 35, let us assume that such a call is locally originated. Let it be further assumed that such a call has been processed by the originating marker 29 and that a path has been established between the originating station and incoming trunk circuit 19. When trunk circuit 1 is seized on the outgoing call by terminating marker 11, a ground potential is applied to lead NS1 shown at the upper left-hand corner of FIG. 3. This potential operates relay 3LF via break contacts of transfers 3SL-9, 2D-5, 3BSY-5, 3INA-5, 3TM-3, 3INC-11, and 3LF-3. In operating, relay 3LF actuates at its contact 3LF-11 relay 3LFA shown directly below the winding of relay 3LF. With reference to the supervisory bridge circuit of FIG. 2, make contact of transfer 3LFA-5 closes a shunt circuit about winding 1–2 of relay 2IN for transmitting a low bridge signal, seizure signal, over trunk 6 to the PBX. Importantly, this path includes diode DHBH (shown in heavy outline) which directionalizes the low bridge signal presented across the conductors of trunk 6. In response to this low bridge seizure signal, relay 2SP of circuit 2 operates, making the trunk busy to outgoing call traffic and preparing the local PBX switching equipment for the receipt of the calling address code. It is noted that relay 2IN does not operate at this time.

At the same time circuit 1 is engaged in transmitting a seizure signal to the distant PBX, terminating marker 11 connects an outgoing sender, such as, sender 8, to the plurality of leads shown at the right lower corner of FIG. 2. As soon as the sender 8 is connected to leads TA and RA shown among that plurality of leads, outgoing sender 8 applies ground to lead D via outgoing sender link 7 for operating relay 2D. The sender 8 replaces the low impedance bridge of the trunk circuit by similar circuitry situated in sender 8 for holding the PBX trunk circuit 2 busy. Actuated contact 2D-5 shown in FIG. 3 opens the operating path of relay 3LF for releasing it. Upon the release of relay 3LF and the consequent release of relay 3LFA, the low impedance circuitry of the bridge which includes diode DHBH is opened. Thereafter, outgoing sender 8 outpulses via leads TA and RA and trunk conductor 6 into the PBX circuitry.

Detection of Simultaneous Seizures

If trunk 6 is seized by trunk circuit 2 for a call outgoing from PBX 35 and as well by trunk circuit 1 for a call outgoing from office 34, this opposing condition is detected by apparatus of circuit 1. For approximately 145 milliseconds (ms.) after terminating marker 11 initially seizes trunk circuit 1, indicated by operation of relay 3LF, circuit 1 monitors the conductors of trunk circuit 6 for a premature acknowledgment signal. During this interval, circuit 1 forwards to PBX 35 a seizure signal utilizing a special bridge circuit arrangement which in the presence of an opposing signal is automatically converted to an idle circuit signal condition. During the 145 ms. testing interval, circuit 1 can signal marker 11 if a glare condition exists for causing the outgoing call from office 34 to be rerouted with the assistance of marker 11 to a different trunk. In the event a glare condition occurs after marker 11 releases and the guard timing interval has lapsed, the call from PBX 35 is allowed to proceed through circuit 1 in the customary manner. If, on the other hand, no premature acknowledgement signal is received during the testing interval, upon cessation of the interval, circuit 1 becomes committed to the outgoing call from office 34. The special bridge arrangement is altered to remove diode DHBH which is no longer required.

Shortly thereafter, the supervisory circuit of an attached outgoing sender, such as, sender 8, replaces the monitoring and bridge circuitry of circuit 1 and the call progresses in the usual manner to completion in PBX 35.

The 145 ms. interval is chosen to ensure that the distant office trunk circuit 2 has sufficient time in the majority of cases to receive the seizure signal from circuit 1 and to make-busy trunk circuit 2 to local traffic. In addition, the interval is compatible with the holding time of marker 11 on terminating call so that the latter is still connected on the call and can be facilely used to reroute the office 34 originated call if a glare occurs. It may be appreciated that in certain instances the transit time of interoffice signals may require a longer or shorter interval for glare timing; and accordingly, the interval timer will require modification.

Turning now to specific circuits and their operation, it will be recalled that upon the selection of circuit 1 by marker 11 to serve an outgoing call, relays 3LF and 3LFA are operated. Thus causes a seizure signal to be sent to PBX 35 and initiates glare timing. It will also be recalled that the seizure signal is generated by connecting a special bridge comprising diode DHBH in series with the lower winding of relay 2IN across conductors T1 and R1 of trunk 6. Note, however, that relay 2IN does not operate on current flowing in the forward direction of diode DHBH; whereas, relay 2SP of circuit 2 does operate to make that circuit busy to local traffic.

Your attention is next directed to FIG. 3 and therein to time delay control 50, as well as to relay 3GLT, which comprises the glare testing circuitry. When contact 3LF-9, shown in the lower left-hand corner of FIG. 3 is actuated, ground is removed from terminal I of circuit 50. Removal of this ground provides a start signal to circuit 50 which initiates the glare timing interval. If a premature acknowledgment signal is not received within the timing interval, upon the cessation of the interval a negative potential is applied by circuit 50 to terminal L for operating relay 3GLT. (It will be recalled that relay 3LF is operated.) Relay 3GLT locks up under control of relay 3TMB over an obvious path. Referring to FIG. 2, diode DHBH of the special bridge circuit is shunted by actuated contact 3GLT-1 thus allowing the low bridge signal to persist in the presence of a reverse battery signal, an acknowledgement signal, form PBX 35 and committing the call connected to trunk circuit 1.

Let us make the assumption that a glare condition occurs before the cessation of the glare timing interval and let us follow the circuit action which results in the release of the call originated at office 34. It will be recalled that a seizure signal from trunk circuit 2 is generated by the activation of transfer contacts RP which reverse the voltage polarity on the conductors of trunk 6. If this reversal occurs during the timing interval relay 2IN operates, diode DHBH is effectively back-biased by the polarity across the conductors. The winding orientation of relay 21N is series aiding with respect to the voltage polarity on the conductors and relay 2IN operates. Upon the operation of relay 3INA which operates directly from relay 2IN, the timing interval ceases. Also, lead BSY to the line choice connector circuit is grounded over a path which includes actuated contacts 3LF-6 and 3INA-6 and contact 3GLT-3 to provide an indication to marker 11 of the simultaneous seizure. Marker 11 thereafter functions to release the call connection to trunk circuit 1 and to seize another trunk circuit (not shown) to process the terminating call to PBX 35. Following the release of marker 11, relays 3LF, 3LFA, and 3SL release. In addition, if the terminating marker 11 action had progressed to the point where sender 8 was attached to circuit 1, sender 8 is released. After the release of the marker and sender, if required, relays 3TMB, 3TMB1, and 3INB release. Upon the release of relay 3TMB at contact 3TMB-4, ground is removed from terminal I of circuit 50 to start the trunk guard timing interval. It is noted that since transfer 3LF-8 is not actuated, the timing interval which is determined by capacitors CGLT and CTM is increased to nominally 800 ms. After the longer interval has lapsed, relay 3TM operates and, in turn, relay 2TMI shown in the bottom of FIG. 2 operates. Subsequently, a loop closure is made between conductors 40 as hereinbefore discussed to make a standard loop start to the line link network 11.

What is claimed is:

1. In a communication switching system having trunks which connect to a distant switching office and over which call traffic originating either at the system or at the office can be switched, glare detection circuitry comprising means for generating a first seizure signal for transmission over one of said trunks to indicate to said office the seizure of said one trunk for a call originating at said system, and means connecting said signal to said trunk to send said signal to said office, said connecting means including a unidirectional device which is effective in the presence of an opposing seizure signal indicating seizure of said one trunk for a call originating at said office to remove said first seizure signal from said path.

2. The invention set forth in claim 1 further including timing means actuated when said first seizure signal is connected to said trunk, and means activated by said timing means after a prescribed interval for rendering said unidirectional device ineffective to remove said first seizure signal.

3. The invention recited in claim 2 further including means for detecting the presence of said opposing signal on said trunk before the termination of said prescribed interval, and means responsive to said detecting means for making said trunk busy to call traffic originated at said system thereby to give preference to call traffic from said office.

4. The invention recited in claim 3 further including means for initiating a second timing interval during which time the preferred call traffic from said office is held, and means actuated thereafter for processing the preferred call traffic.

5. An interoffice two-way trunk circuit for controlling the establishment of incoming or outgoing calls between a first and a second switching office via a common interoffice communication path comprising means responsive to an outgoing call connection completed to said circuit by said first switching office for sending a first seizure signal via said path to said second switching office, means responsive to the receipt of an opposing seizure signal sent by said second office for detecting an opposing incoming call originated at said second switching office, means actuated by said sending means after sending said first seizure signal for connecting said detecting means to said path for a prescribed period for detecting said opposing seizure signal, and means actuated by the presence of said opposing seizure signal for removing said first seizure signal from said path prior to actuation of said detecting means.

6. The invention set forth in claim 5 further including in said removing means a unidirectional device which is positioned in series relation with said sending means and which is nonconductive in the presence of an opposing seizure signal.

7. The invention recited in claim 6 further including means actuated at the cessation of said prescribed period for bypassing said device which thereafter is ineffective in the presence of an opposing seizure signal for removing said first seizure signal.

8. In combination, first and a second switching office, a communication path connected between said offices over which calls originated at either office and destined for termination at the other office are routed, a first and a second trunk circuit connected to the termini of said path respectively at said first and second switching offices, means in said first trunk circuit responsive to the extension of a call via said first switching office to said first trunk circuit for connecting a first seizure signal to said path, means in said second trunk circuit monitoring said path and responsive to the receipt of said first seizure signal for preventing the connection of subsequent calls originated at said second switching office to said second trunk circuit, and means in said first trunk circuit monitoring said path for a simultaneous seizure thereof by opposing calls which originate at said first and second switching offices and are respectively connected to said first and second trunk circuits comprising: (a) means timing a prescribed interval after the connection of said first seizure signal to said path, (b) means monitoring said path for detection of an opposing seizure signal indicating an originating call connection to said second trunk circuit during said prescribed interval, and (c) means inserted in series relation with said first seizure signal connecting means for preventing the transmission of said first seizure signal in the presence of said opposing signal.

9. The invention set forth in claim 8 further including means actuated at the cessation of said interval for bypassing said inserted means to render said inserted means ineffective in the presence of said opposing signal.

10 The invention claimed in claim 8 further including in said first trunk circuit first signaling means for generating said first seizure signal by connecting a low impedance element across conductors of said path and also including in said second trunk circuit second signaling means for generating said opposing seizure signal by connection of different voltage potentials to said conductors of said path.

* * * * *